United States Patent
Suzuki et al.

(10) Patent No.: US 6,846,438 B2
(45) Date of Patent: Jan. 25, 2005

(54) METHOD AND APPARATUS FOR CONTROLLING MOLDING MACHINE

(75) Inventors: Masamitsu Suzuki, Numazu (JP); Yutaka Yamaguohi, Shizuoka-Ken (JP); Motoyuki Miyauchi, Sizuoka-Ken (JP); Makoto Nishizawa, Numazu (JP); Akira Kanda, Sapporo (JP)

(73) Assignee: Toshiba Kikai Kabushiki Kaisha, Tokyo-To (JP)

( * ) Notice: Subject to any disclaimer, the term of this patent is extended or adjusted under 35 U.S.C. 154(b) by 199 days.

(21) Appl. No.: 10/140,820

(22) Filed: May 9, 2002

(65) Prior Publication Data

US 2002/0180080 A1 Dec. 5, 2002

(30) Foreign Application Priority Data

May 9, 2001 (JP) ........................................ 2001-138024

(51) Int. Cl.$^7$ .............................................. B29C 45/76
(52) U.S. Cl. .................... 264/40.1; 264/328.1; 425/162; 425/169
(58) Field of Search ............................. 264/40.1, 328.1; 425/162, 169, 173, 589; 700/200

(56) References Cited

U.S. PATENT DOCUMENTS

| | | | | |
|---|---|---|---|---|
| 4,755,123 A | * | 7/1988 | Otake | ........................ 425/145 |
| 4,826,640 A | * | 5/1989 | Neko | ........................ 425/145 |
| 4,847,023 A | * | 7/1989 | Neko | ........................ 264/40.1 |
| 6,144,182 A | * | 11/2000 | Totani et al. | ................ 425/145 |
| 6,332,355 B1 | * | 12/2001 | Totani et al. | .................. 73/162 |
| 6,610,225 B2 | * | 8/2003 | Usui et al. | .................. 264/40.1 |
| 6,695,994 B2 | * | 2/2004 | Bulgrin et al. | ............. 264/40.1 |

* cited by examiner

Primary Examiner—Jill L. Heitbrink
(74) Attorney, Agent, or Firm—Pillsbury Winthrop LLP

(57) ABSTRACT

There is provided a molding machine controlling unit and method capable of preventing the operation of a molding machine from suddenly stopping due to the temperature of an electric motor. The control unit comprises: a calculating part 40 for analyzing molding condition data to generate a command value for producing a torque to the rotating shafts of electric motors 71 through 73 of an injection molding machine and to calculate an effective value on the basis of the command value; an entry part 30 for entering a reference value, which is to be compared with the effective value, and the molding condition data; a storing part 35 for storing the reference value and the molding condition data; a display part 50 for displaying the effective value and the reference value; and driving parts 61 through 63 for entering the command value to drive the rotating shafts of the electric motors, wherein the effective value and the reference value are displayed as a standard for preparing the molding condition data so that the effective value does not exceed the reference value.

14 Claims, 6 Drawing Sheets

|  | FIRST ELECTRIC MOTOR | SECOND ELECTRIC MOTOR | THIRD ELECTRIC MOTOR |
|---|---|---|---|
| REFERENCE VALUE | 20 | 50 | 30 |
| EFFECTIVE VALUE | 19 | 55 | 29 |

*FIG. 4*

|  | FIRST ELECTRIC MOTOR | SECOND ELECTRIC MOTOR | THIRD ELECTRIC MOTOR |
|---|---|---|---|
| REFERENCE VALUE | 20 | 50 | 30 |
| EFFECTIVE VALUE | 19 | 30 | 29 |

*FIG. 5*

METHOD AND APPARATUS FOR CONTROLLING MOLDING MACHINE

BACKGROUND OF THE INVENTION

1. Field of the Invention

The present invention generally relates to a molding machine, such as an injection molding machine and a die casting machine. More specifically, the invention relates to a method and an apparatus for controlling a molding machine capable of preventing the temperature of an electric motor of the molding machine from increasing so as not to discontinue the operation of the molding machine suddenly due to the overheating of the electric motor.

2. Description of the Prior Art

Conventionally, there is adopted a safety measure for stopping a molding machine to protect an electric motor in a case where the torque of the electric motor exceeds a reference torque continuously over a predetermined allowable time. Referring to FIG. 6, the safety measure will be described below. FIG. 6 is a chart showing a case where the torque of an electric motor or a molding machine continuously exceeds a reference torque over a allowable time. That is, this figure shows the state that a torque Tr continuously exceeds a reference torque Trf over a allowable time T, and the operation of a molding machine suddenly stops so that the torque Tr drops from a point P1 to a point P2 to be zero. Referring to the flow chart of FIG. 8, this protecting method will be described below. FIG. 8 is a flow chart showing a conventional method for protecting an electric motor of a molding machine. The routine shown in this flow chart is repeatedly executed every one unit time, i.e., every one sampling time. The routine shown in this flow chart is a sub-routine which is included in the whole routine for controlling a molding machine and which starts every a certain sampling time to execute a processing to return to a routine before starting this sub-routine. First, at step 1, a torque Tr is read out at an integrated time t. Then, at step 2, it is determined whether the torque Tr exceeds a referenced torque Trf at the integrated time t. If the torque Tr does not exceed the reference torque Trf, the integrated time t is initialized to zero at step 3 so that the integration of the integrated time t starts from 1 when the torque Tr first exceeds the reference torque Trf. If the torque Tr exceeds the reference torque Trf, the integrated time t is increased by 1 at step 4. At step 5, the integrated time t is compared with the permissible time T. If the integrated time t is within the permissible time T, the execution of this sub-routine ends, and the sub-routine returns to a routine before starting the sub-routine. If the torque Tr subsequently continuously exceeds the reference torque Trf, the integrated time t is added by 1 every time the routine passes through step 4. If the integrated time t is continuously added to exceed the permissible time T, the determination at step 5 is yes, and the routine goes to step 6 to stop the operation of the molding machine at step 6.

If a load applied to the electric motor as shown in FIG. 7, the overload state of the electric motor is not detected by the above described method, so that there are some cases where the electric motor is overheated to raise its temperature which exceeds a allowable range. Referring to FIG. 7, the state thereof will be described below. FIG. 7 shows a case where the torque of an electric motor of a molding machine repeatedly exceeds a reference torque and decreases lower than the reference torque again within a permissible time. That is, while the torque Tr repeatedly exceeds the reference torque Trf again and again, the temperature of the electric motor rises to make the protection operation start to stop the electric motor at a point Pn+1, so that the torque Tr drops from the point Pn+1 to a point Pn+2 to be zero. In the case of FIG. 7, the torque Tr is lower than the reference torque every time as shown by the points P1, P2 and Pn after clasping the allowable time T. That is, FIG. 7 does not show the state shown by the point P1 in FIG. 6 in which the torque Tr continuously exceeds the reference torque Trf over the allowable time T, and does not show the state that the operation of the molding machine is suddenly stopped by detecting the overload of the torque. While such commands are repeated, there are some cases where it is detected that the temperature of the electric motor rises to exceed a allowable range, so that the operation of the molding machine is suddenly stopped.

If the operation of the molding machine is thus suddenly stopped, the melted polymer or metal is cooled and solidified in the molding machine, and it takes a lot of time to allow the operation to resume, so that the sudden stopping of the operation should be avoided. However, as a result of the repetition of loaded conditions approximating overload, it is very difficult for the operator to cope with the detection of temperature. In the prior art, it is not possible to predict the fact that the temperature of the electric motor exceeds the permissible range, so that it is not possible to prevent the sudden stopping of the operation of the molding machine due to overheating of the electric motor.

SUMMARY OF THE INVENTION

Therefore, in order to prevent the sudden stopping of the operation of a molding machine, it is required to prevent the temperature of an electric motor from exceeding a permissible range.

It is therefore an object of the present invention to eliminate the aforementioned problems and to provide a molding machine controlling unit and method capable of preventing the sudden stopping of the operation of the molding machine due to the temperature rise of an electric motor, by giving a standard for preparing molding condition data, which are to be re-entered, to an operator by indicating an effective value, which is calculated on the basis of a command value for generating a torque to the rotating shaft of the electric machine, and a reference value, after paying attention to the fact that it is possible to prevent the temperature of the electric motor from exceeding a permissible range by causing the effective value to be the reference value or less on the basis of a correlation between a temperature rise due to the heating of the electric motor of the molding machine and the effective value.

In order to accomplish the aforementioned and other objects, according to one aspect of the present invention, an apparatus for controlling a molding machine, said apparatus comprises inputting means for entering molding condition data, the data determining operating conditions of the molding machine; storing means for storing a reference value and the molding condition data, the reference value being set up as a standard to prevent temperatures of electric motors which drive each units of the molding machine from exceeding an allowable range; calculating means for analyzing molding condition data to generate a torque command value for producing a torque to the rotating shaft of the electric motor of the molding machine and to calculate an effective value per one molding cycle on the basis of the command value; driving means for the electric motors based on the torque command value; display means for displaying an table showing the effective value and the reference value arranged in comparison as an guide when an operator for the molding machine prepares the molding condition data.

Since the effective value and the reference value are thus displayed on the display means, the operator can compare the effective value with the reference value and re-enter the molding condition data so an to increase the rotation stopping time for the electric motor when the effective value exceeds the reference value, so that the effective value can be lower than the reference value.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 4 is a table showing an example of a table on a display means relating to the present invention;

FIG. 5 is another table showing an example of a display on a display means relating to the present invention;

DESCRIPTION OF THE PREFERRED EMBODIMENTS

Referring now to the accompanying drawings, particularly to FIGS. 1 through 5, the preferred embodiment according to the present invention will be described below.

Figure 1:
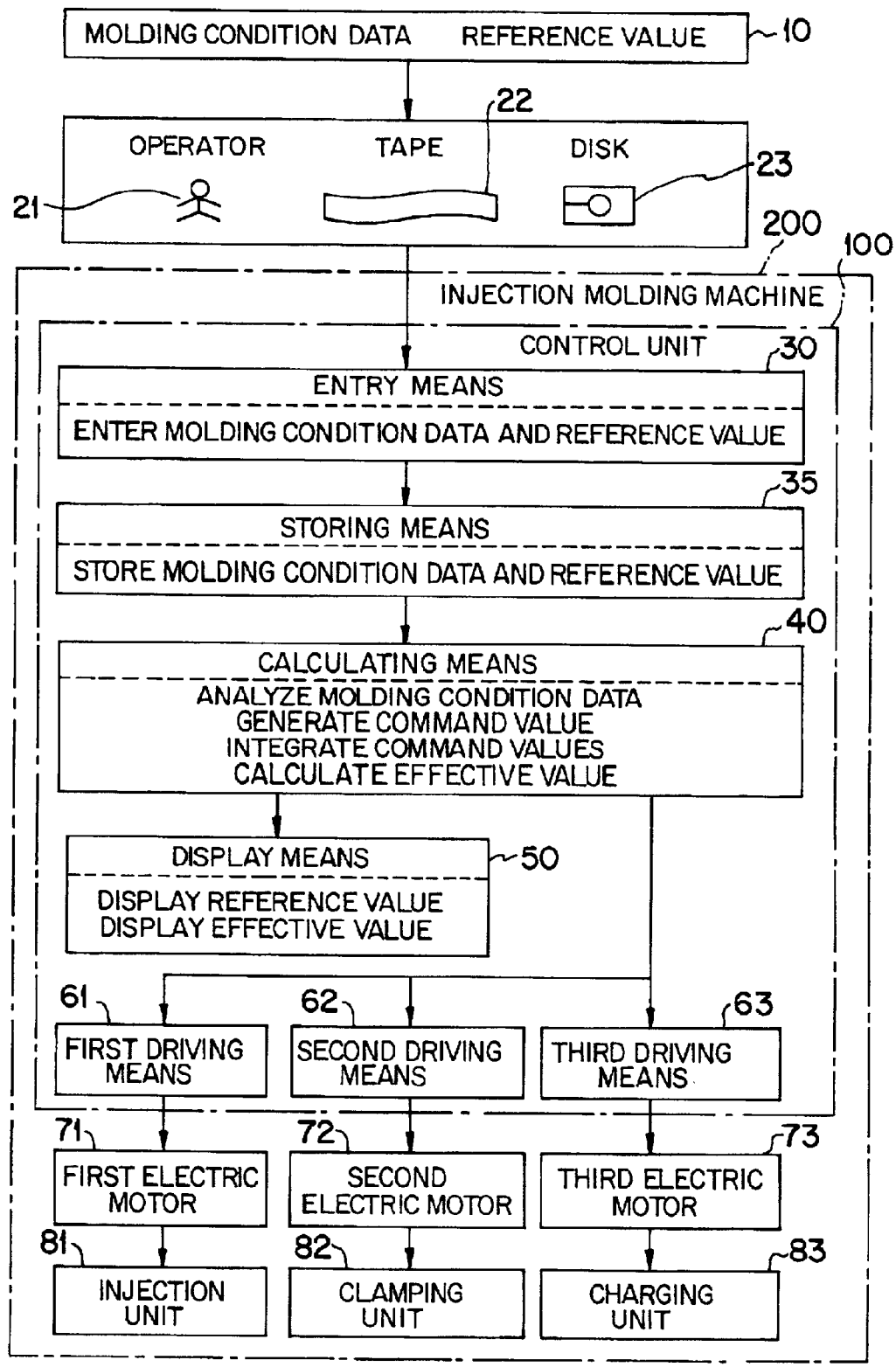
FIG. 1 is a block diagram showing the construction of an injection molding machine including a control unit for controlling the injection molding machine corresponding to a molding machine according to the present invention.

FIG. 1 is a block diagram showing an injection molding machine including a control unit according to the present invention. An injection molding machine 200 comprises: a control unit 100 for controlling a first electric motor 71, a second electric motor 72 and a third electric motor 73; the electric motors 71 through 73; an injection unit 81 for injecting a molten polymer into dies for molding a mold part; a clamping unit 82 for opening and closing the dies for clamping the dies while the polymer being injected and for ejecting a molded article; and a charging unit 83 for charging the amount of the polymer to be injected into the dies. The injection unit 81, the clamping unit 82 and the charging unit 83 are driven by the first electric motor 71, the second electric motor 72 and the third electric motor 73, respectively.

The control unit 100 comprise: an calculating means 40 for analyzing molding condition data, which are shown by reference numbers 10, 30, 35 and 40 in FIG. 1, to generate a torque command value for generating a desired torque to the rotating shafts of the respective electric motors 71 through 73 of the injection molding machine 200, and to calculate an effective value on the basis of the torque command value; an input means 30 for entering a reference value, which is to be compared with the effective value shown by reference number 10 in FIG. 1, and the molding condition data; a storing means 35 for storing the reference value and the molding condition data; a display means 50 for displaying the effective value and the reference value; and a first driving means 61, second driving means 62 and third driving means 63 for driving the electric motors 71 and 73 based on the respective torque command values, respectively.

The calculating means 40 calculates an effective value in accordance with the following expressions (1) and (2):

$$T - \sum_{n=1}^{N} [\{T_{r(n \cdot \Delta t)}\}^2 \cdot \Delta t] \tag{1}$$

wherein $\Delta t$ denotes a sampling time, N denoting the number of samplings, n denoting a positive integer sequentially increasing from 1 to N, $T_{r(n \cdot \Delta t)}$ denoting a torque command value at a time ($n \cdot \Delta t$), and T denoting an integrated value of a square of the torque command value to the time ($n \cdot \Delta t$), and $$T_{rs} = \sqrt{\frac{\sum_{n=1}^{N} [\{T_{r(n \cdot \Delta t)}\}^2 \cdot \Delta t]}{N \cdot \Delta t}} \tag{2}$$

wherein $\Delta t$ denotes a sampling time, N denoting the number of samplings, n denoting a positive integer sequentially increasing from 1 to N, $T_{r(n \cdot \Delta t)}$ denoting a torque command value at a time ($n \cdot \Delta t$), and $T_{rs}$ denoting an effective value of a torque command value per one molding cycle.

FIGS. 4 and 5 show examples of displays on a display means relating to the present invention. FIG. 4 shows that the effective value of the second electric motor 72 exceeds the reference value so that the second electric motor 72 is in an overload state. It is assumed that the operator 21 for the injection molding machine 200 enters the molding condition data, which is shown by reference number 10 in FIG. 1, by a manual operation or by means of a tape 22 or a disk 23, to start the operation of the injection molding machine 200. After the first molding cycle, an effective value, e.g., 55, which is calculated on the first molding cycle, is displayed on a column for the effective value of the second electric motor 72 in FIG. 4. Simultaneously, for example, 50 is displayed on a column for the reference value of the electric motor 72 in FIG. 4. Since the effective value exceeds the reference value, it is required to re-enter molding condition data to prevent the effective value from exceeding the reference value. In another case of FIG. 5, as an effective value, e.g., 30, is displayed to leave a margin to the reference value of 50, the operator for the injection molding machine can recognize the fact that it is possible to shorten the time required to carry out a molding by re-entering molding condition data.

Thus, the operator 21 for the injection molding machine 200 can see the display on the display means 50 in FIG. 1 to know a standard for the molding condition data to prevent the effective value from exceeding the reference value, so that it is easy to enter the molding condition data. The operator 21 for the injection molding machine 200 compares it with the reference value to re-enter the next molding condition data, e.g., the time to driving or stopping the rotating shaft of the electric motor of the injection molding machine 200, so that it is possible to carry out a molding without suddenly stopping the operation of the injection molding machine 200.

With respect to the reference value, the value of the continuous rating torque of the electric motor may be used, or a numerical value slightly below the value of the continuous rating torque may be experientially to be set as a reference value for the command of the electric machine in order to more stably operate the injection molding machine.

Figure 2:
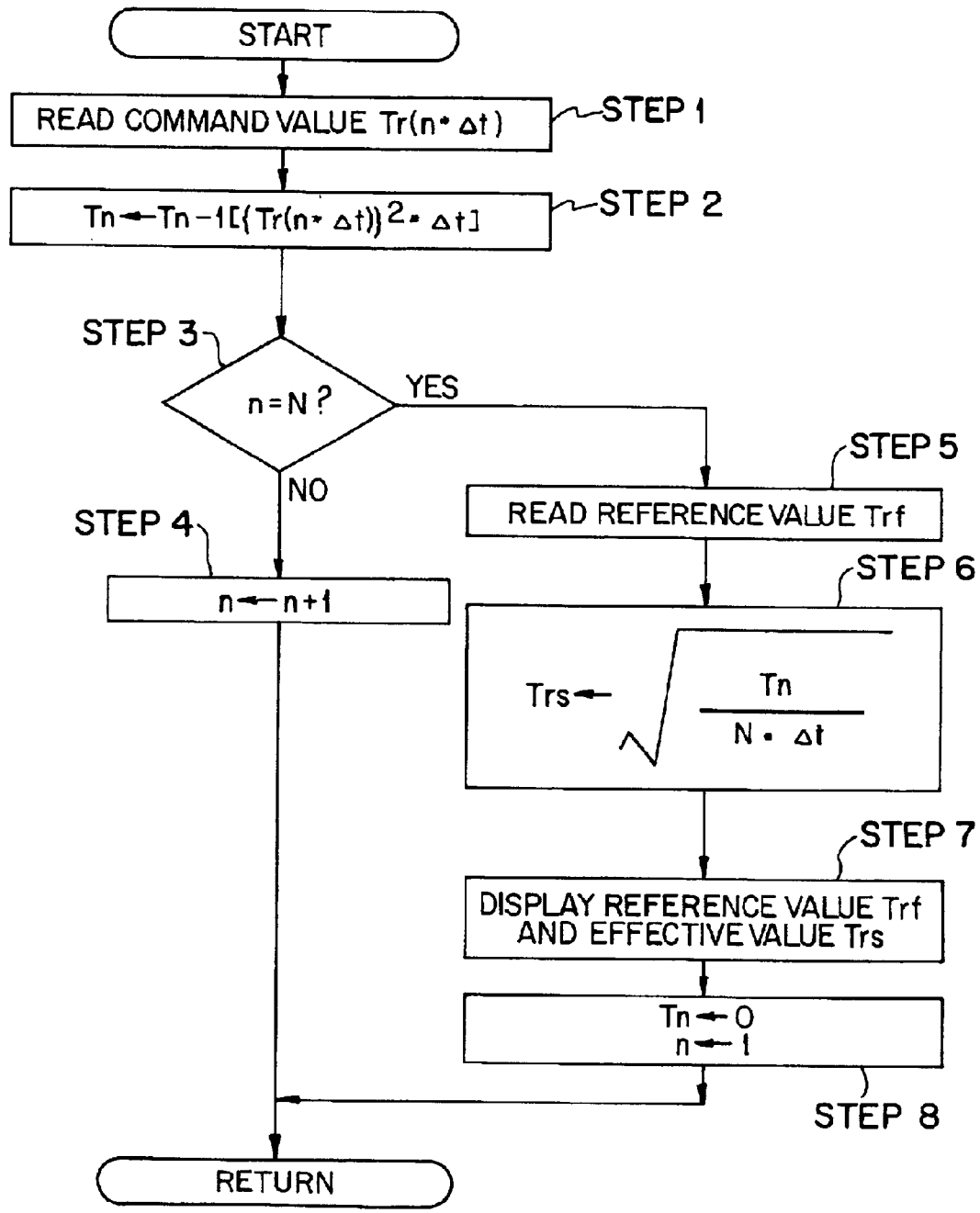
FIG. 2 is a flow chart showing a method for displaying a reference value and an effective value for an electric motor of an injection molding machine according to the present invention.
Figure 3:
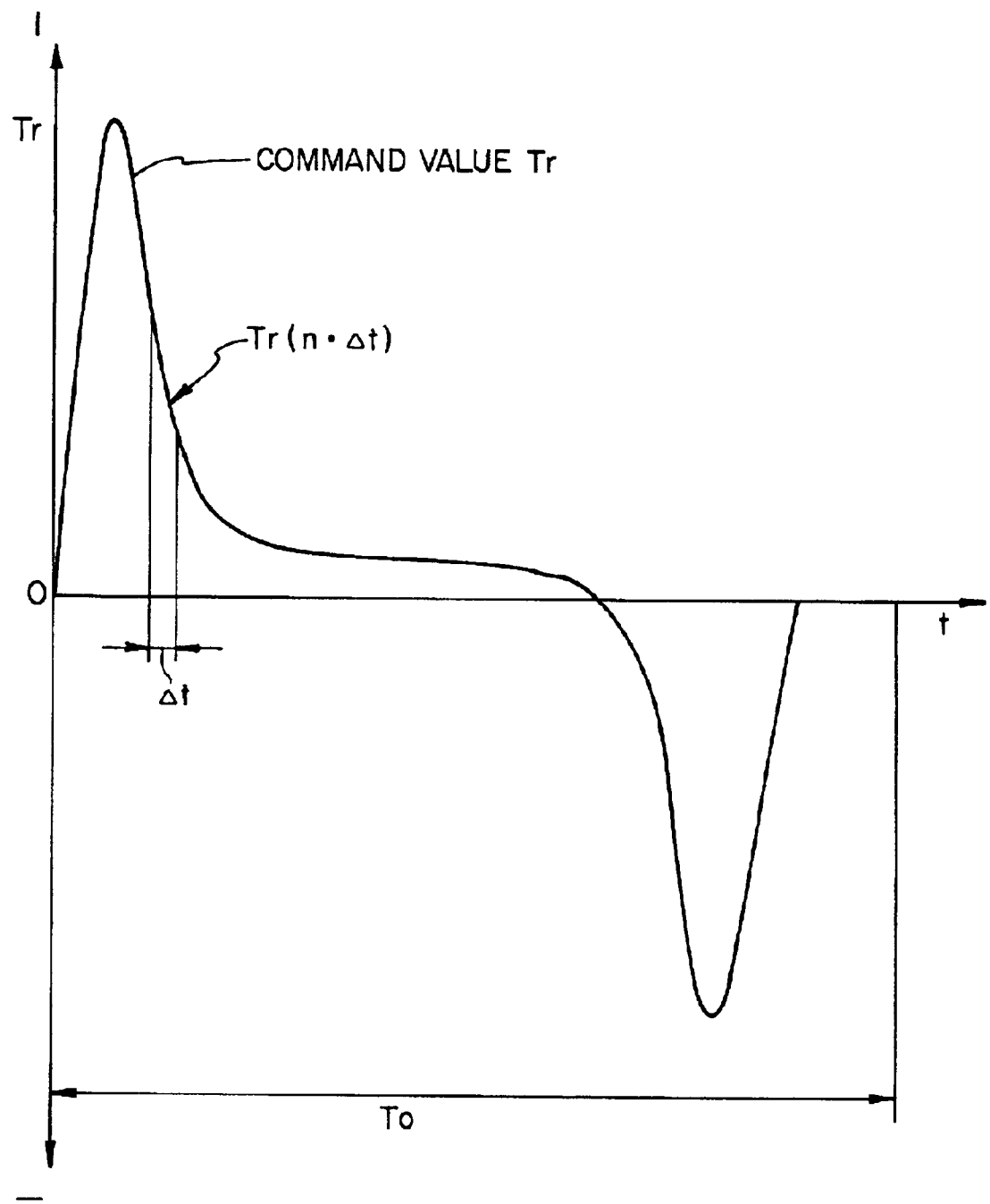
FIG. 3 is a chart showing an example of a command value for an electric motor of an injection molding machine according to the present invention.
Figure 6:
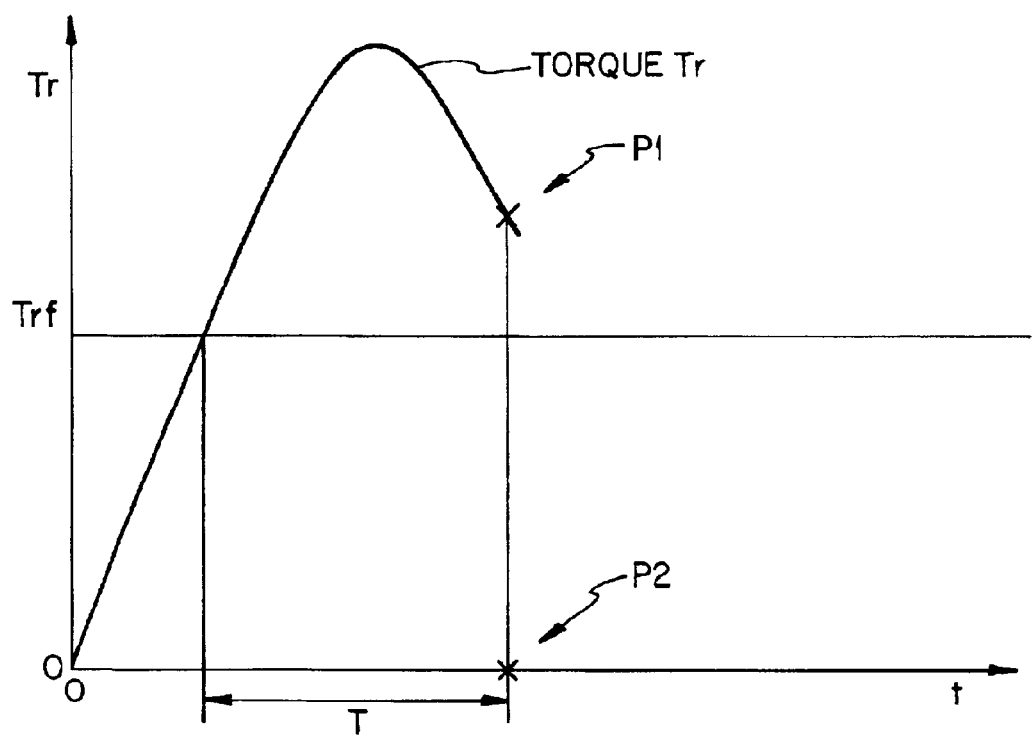
FIG. 6 is a chart showing a case where the torque of an electric motor of a molding machine continuously exceeds over a permissible time.
Figure 7:
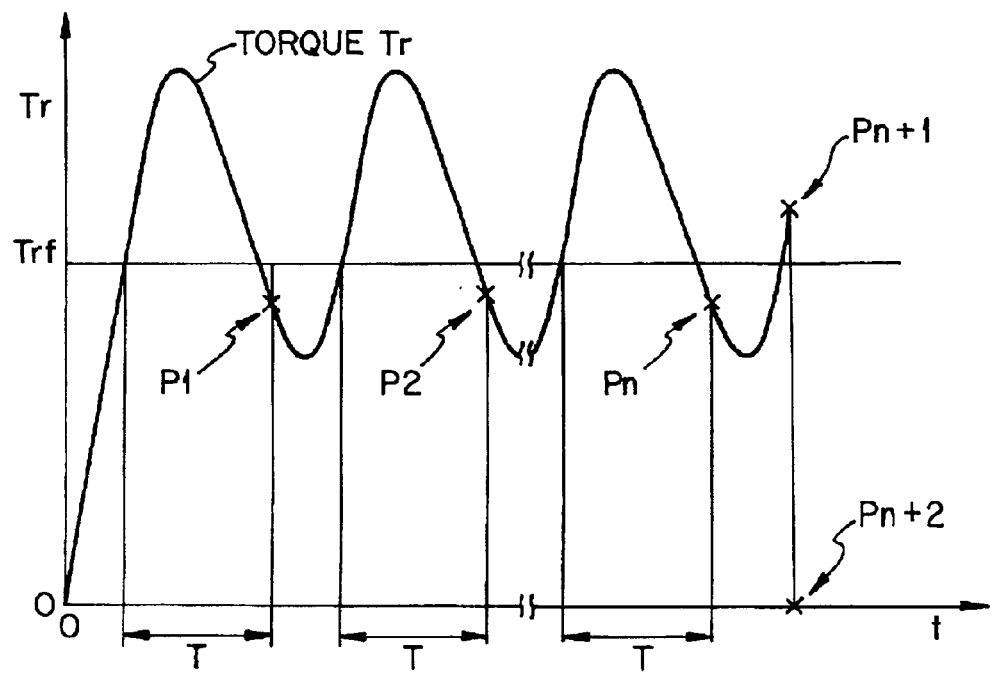
FIG. 7 is a chart showing a case where the torque of the electric motor of the molding machine repeatedly exceeds a reference torque to be the reference torque or less again within the permissible time.
Figure 8:
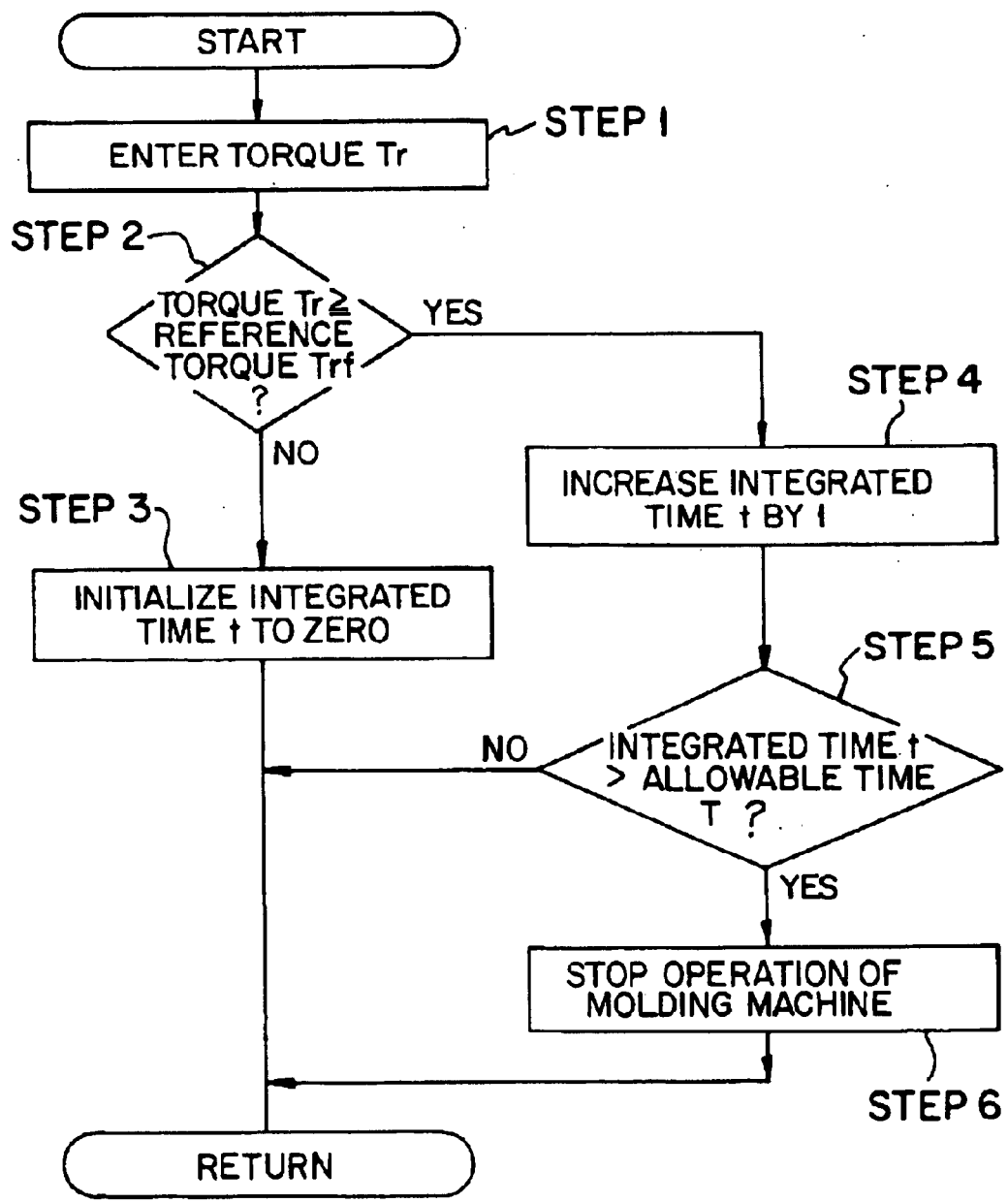
FIG. 8 is a flow chart showing a conventional method for protecting an electric motor.

Referring to FIGS. 2 and 3, the procedures that a reference value for an effective value and the effective value are displayed after obtaining the effective value on the basis of torque command values relating to the electric motors 71 through 73 of the injection molding machine 200 according to the present invention will be described below. FIG. 3 shows on example of a torque command value with respect to the electric motor of the injection molding machine according to the present invention. In FIG. 3, Δt denotes, a one sampling time, and a torque command value Tr is divided by a sampling time Δt in the direction of time base to repeat an integration every sampling time Δt. Since the torque command values Tr include negative values, a method for integrating the squared torque command values Tr to obtain a square root of the integrated value is used for obtaining an effective value. The Tr(n·Δt) is a torque command value at time (n·Δt), i.e., at the n-th sampling time. The molding time Tc shown in FIG. 3 is a time required to carry out one molding cycle for, clamping the diea, injecting a molten polymer into the dies, opening the die to eject a molded article. If the molding time Tc is sampled by the sampling time Δt to carry out N samplings, one molding cycle ends at n=N.

FIG. 2 is a flow chart showing a procedures for displaying a reference value and an torque effective value for the electric motor of the injection molding machine according to the present invention. First, at step 1 in FIG. 2, a torque command value Tr(n·Δt) at time (n·Δt) is read out. Since n−1 at first, the torque, command value is Tr(1·Δt). When step 1 is executed at the next sampling time, the torque command value is Tr(2·Δt) since n=2. If the square of the torque command value is integrated until time (n·Δt) at step 2, $Tr^2(1·Δt)·Δt+Tr^2(2·Δt)·Δt+ \ldots +Tr^2(n·Δt)·Δt$ is integrated. At step 3, it is determined whether n−N, i.e., whether one molding cycle ends. Since immediately after the molding cycle starts, n=N is not determined, i.e., "no" is determined at step 3, and the routine goes tn step 4. At step 4, n is increased by 1. After executing step 4, the routine returns to the last routine before the routine shown in this flow chart starts, and the other processing is executed. After the next sampling time, i.e., after (2·Δt), a torque command value Tr(2·Δt) is read at step 1. At step 3, "no" is determined since n is not N, and the routine goes to step 4. While the above described flow is repeated any number of times, one molding cycle ends, and n=N, so that the determination at step 3 is "yes" and the routine goes to step 5. The reference value Trf stored in the storing means shown in FIG. 1 is read to be compared with an effective value, and an effective value Trs is calculated in accordance with an expression at step 6 to be stored in the storing means. At step 7, the reference value Trf and the effective value Trs are displayed. At step 8, the integrated Tn−1 is set to be zero, i.e., T0 is set to be 0 and n is initialized to 1, for the next molding cycle.

While this preferred embodiment of the present invention has adopt a method for storing the reference value in the storing means from the entry means, there may be adopted a method for previously setting the reference value in the storing means by a method for simultaneously setting the reference value when being installed in a control unit program which is installed in a control unit for directly controlling a molding machine without any entry means.

While the electric motors controlled by the control unit have been three electric motors comprising the first through third electric motors, the number of electric motors may be increased, and the effective and reference values of commands for the increased electric motors may be displayed.

According to the present invention, the effective value and the reference value are displayed, and the operator for the molding machine can compare the effective value with the reference value to set such molding condition data that the effective value does not exceed the reference value, so that it is possible to continuously operate the molding machine without stopping the operation of the molding machine. Therefore, the operation of the molding machine does not suddenly stop due to the detection of the temperature of the electric motor, so that it is possible to prevent a polymer or metal material from being solidified in the molding machine.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for controlling a molding machine, said method comprising:

setting up a reference value as a standard to prevent temperatures of electric motors which drive each units of the molding machine from exceeding an allowable range;

inputting molding condition data, the data determining operating conditions of the molding machine;

storing the reference value and the molding condition data;

calculating to analyze the molding condition data to generate a torque command value for producing a torque to the rotating shaft of the electric motor of the holding machine and to calculate at least an integrated value over time of a function of the torque command value to calculate an effective value of the torque command value;

driving the electric motors based on the torque command value; and displaying an table showing the effective value and the reference value arranged in comparison as an guide when an operator for the molding machine prepares the molding condition data.

2. The method according to claim 1, wherein said reference value is set up to a continuous rating torque of the electric motor.

3. The method according to claim 1, wherein said reference value is set up experientially to a numerical value slightly below the value of a continuous rating torque.

4. The method according to claim 1, wherein the mold condition data are re-entered when the effective value exceeds the reference value.

5. An apparatus for controlling a molding machine, said apparatus comprising:

inputting means for entering molding condition data, said data determining operating conditions of the molding machine;

storing means for storing a reference value and the molding condition data, the reference value being set up as a standard to prevent temperatures of electric motors which drive each units of the molding machine from exceeding an allowable range;

calculating means for analyzing the molding condition data to generate a torque command value for producing a torque to the rotating shaft of the electric motor of the molding machine to calculate at least an integrated value over time of a function of the torque command value to calculate an effective value of the torque command value;

driving means for the electric motors based on the torque command value; and display means for displaying an table showing the effective value and the reference value arranged in comparison as an guide when an operator for the molding machine prepares the molding condition data.

6. The apparatus according to claim 1, wherein said reference value is a continuous rating torque of the electric motor.

7. The apparatus according to claim 1, wherein said reference value is variable at desired value by inputting it from the inputting means to store on the storing means.

8. The apparatus according to claim 1, wherein said inputting means is capable of re-entering the mold condition data when the effective value exceeds the reference value.

9. The apparatus according to claim 1, wherein said molding machine is an injection molding machine including an injection unit, a clamping unit and a charging unit, which are driven by the electric motor respectively.

10. An apparatus for controlling a molding machine, said apparatus comprising:

a data inputting portion for entering molding condition data, wherein said molding condition data determining operating conditions of the molding machine;

a memory for storing a reference value and the molding condition data, wherein the reference value being set up as a standard to prevent temperatures of electric motors which drive each units of the molding machine from exceeding an allowable range;

a calculating portion for analyzing the molding condition data to generate a torque command value for producing a torque to the rotating shaft of the electric motor of the molding machine and to calculate at least an integrated value over time of a function of the torque command value to calculate an effective value of the torque command value;

a driving portion that drives the electric motors based on the torque command value; and a display displaying table showing the effective value and the reference value arranged in comparison as an guide when an operator for the molding machine prepares the molding condition data.

11. The apparatus according to claim 10, wherein said reference value is a continuous rating torque of the electric motor.

12. The apparatus according to claim 10, wherein said reference value is variable at desired value by inputting it from the data inputting portion to store on the memory.

13. The apparatus according to claim 10, wherein said data inputting portion is capable of re-entering the mold condition data when the effective value exceeds the reference value.

14. The apparatus according to claim 10, wherein said molding machine is an injection molding machine including an injection unit, a clamping unit and a charging unit, which are driven by the electric motor respectively.

* * * * *

UNITED STATES PATENT AND TRADEMARK OFFICE
CERTIFICATE OF CORRECTION

PATENT NO. : 6,846,438 B2
DATED : January 25, 2005
INVENTOR(S) : Masamitsu Suzuki et al.

It is certified that error appears in the above-identified patent and that said Letters Patent is hereby corrected as shown below:

Title page,
Item [75], Inventors, replace "Yutaka Yamaguohi" with -- Yutaka Yamaguchi --.

Signed and Sealed this

Third Day of May, 2005

JON W. DUDAS
*Director of the United States Patent and Trademark Office*